Patented Sept. 9, 1947

2,426,983

REISSUED

UNITED STATES PATENT OFFICE 2,426,983

LUBRICANT COMPOSITION

Austin T. Collins, Detroit, Mich.

No Drawing. Application February 6, 1945,
Serial No. 576,509

3 Claims. (Cl. 252—29)

My invention relates to a new composition of matter, and more particularly to a synthetic graphite mixture suitable for coating metal and other surfaces in such a manner as to more permanently secure the graphite to the surface being coated.

Heretofore many solutions and mixtures, usually in a liquid form have been used in an attempt to apply a graphite coating to a metal or other surface. As far as I know most of these attempts have not produced satisfactory coatings, since the graphite, after being deposited, has not adhered tenaciously enough to the surface to avoid being rubbed off.

To my knowledge all other solutions or mixtures in a liquid form which have been used in an attempt to apply graphite coating to a metal or other surface, have required that the temperature of the parts to be treated, or the liquid, or both, be raised above the working room temperature.

It is an object of my present invention to provide a new composition of matter containing synthetic graphite in order to overcome the difficulties heretofore encountered, and to thus produce a result superior to any attained heretofore. My improved results have been obtained by the use of a new composition of matter consisting of a mixture of synthetic graphite, a solvent and a carrier or penetrating solution, all of which co-operate to facilitate the application of graphite on a surface in such a way as cause the graphite to adhere more tenaciously to said surface and to thus provide an efficient and practical dry lubrication for said surface.

The present invention relates to a liquid mixture which is applied at room temperatures thereby obviating the application of heat to the part which is to be treated or to the liquid.

For a more detailed understanding of my invention, reference may be had to the accompanying specification and claims in which the details of my invention are more particularly defined.

My improved composition of matter comprises a mixture of synthetic graphite, methyl alcohol and a chlorinated hydrocarbon solution, all of which are thoroughly mixed together and made ready for use. More specifically, I first mix about twenty (20) per cent of synthetic graphite with about eighty (80) per cent of methyl alcohol by volume, that is, a ratio of about one (1) to four (4) by volume. I then take this mixture and mix it with a chlorinated hydrocarbon solution in the proportion by volume of about one (1) part of the aforesaid graphite alcohol mixture to about nine (9) or ten (10) parts and not in excess of about twelve (12) parts of the chlorinated hydrocarbon solution, such as carbon tetrachloride (CCl₄) or trichlorethylene C₂HCl₃. This whole mixture is thoroughly agitated to thoroughly mix all the ingredients of said composition of matter.

The above chlorinated hydrocarbon solution is more generally classed as a penetrating solution, and thus serves to carry the synthetic graphite particles more readily into the pores of the surface which is to be coated, said chlorinated hydrocarbon solution being of such volatile nature as to very readily evaporate. The action of the methyl alcohol is to provide a liquid medium which serves to carry the synthetic graphite in suspension. In fact, there are several well known liquid graphite mixtures obtainable on the open market, and the one I preferably use is one which comprises a mixture by volume of one (1) part of synthetic graphite with about four (4) parts of methyl alcohol.

The present composition may be applied to a metal or other surface by spraying the liquid composition onto said surface or by dipping the piece to be coated into the liquid composition. The graphite will adhere tenaciously to the surface after the liquids are evaporated.

Thus it will be seen that the above described liquid composition is practical, and after many exhaustive tests, has proved to be superior to anything heretofore obtainable, especially for lubricating metal surfaces. This liquid composition works equally as well on plastic and other materials.

Although I have described but one application of my invention, it will be apparent to those skilled in the art to which my invention pertains that various modifications and changes may be made therein without departing from the scope of the appended claims.

I claim:

1. A dispersion of synthetic graphite in a volatile liquid for coating surfaces by drying through volatization consisting essentially of about one part of synthetic graphite, about four parts of methyl alcohol, and about forty-five to sixty parts of a volatile chlorinated hydrocarbon of the class consisting of carbon tetrachloride and trichlorethylene, said parts being by volume.

2. A dispersion of synthetic graphite in a volatile liquid for coating surfaces by drying through volatization consisting essentially of about one part of synthetic graphite, about four parts of methyl alcohol, and about forty-five to sixty parts of carbon tetrachloride, said parts being by volume.

3. A dispersion of synthetic graphite in a volatile liquid for coating surfaces by drying through volatization consisting essentially of about one part of synthetic graphite, about four parts of methyl alcohol, and about forty-five to sixty parts of trichlorethylene, said parts being by volume.

AUSTIN T. COLLINS.

REFERENCES CITED

The following references are of record in the file of this patent:

UNITED STATES PATENTS

| Number | Name | Date |
| --- | --- | --- |
| 1,185,682 | Kirkegaard | June 6, 1916 |
| 1,857,235 | Burton | May 10, 1932 |
| 1,946,121 | Wood | Feb. 6, 1934 |

OTHER REFERENCES

Colloidal Graphite, A Modern Lubricant by Carleton (Chemical Industries Jan. 1943), p. 50-2.